US006277296B1

(12) United States Patent
Scheffee et al.

(10) Patent No.: US 6,277,296 B1
(45) Date of Patent: Aug. 21, 2001

(54) FIRE SUPPRESSANT COMPOSITIONS

(75) Inventors: Robert S. Scheffee, Lorton; Jamie B. Neidert, Jeffersonton; Robert E. Black, III, Centreville; Robert D. Lynch, Warrenton; James D. Martin, Manassas, all of VA (US)

(73) Assignee: Atlantic Research Corporation, Gainsville, VA (US)

( * ) Notice: Subject to any disclaimer, the term of this patent is extended or adjusted under 35 U.S.C. 154(b) by 0 days.

(21) Appl. No.: 09/451,115

(22) Filed: Nov. 30, 1999

(51) Int. Cl.[7] .............................. A62D 1/06; C06B 45/02; C08K 5/00

(52) U.S. Cl. .............................. 252/5; 252/4; 149/19.1; 149/19.2; 149/62; 149/92; 149/109.2

(58) Field of Search .............................. 252/5, 4; 149/19.1, 149/19.2, 62, 92, 109.2

(56) References Cited

U.S. PATENT DOCUMENTS

| | | | | |
|---|---|---|---|---|
| 191,306 | | 5/1877 | Budy | 252/5 |
| 1,807,456 | | 5/1931 | Wedger et al. . | |
| 3,017,348 | | 1/1962 | Steppe et al. | 252/2 |
| 3,972,820 | | 8/1976 | Filter et al. | 252/5 |
| 4,128,443 | * | 12/1978 | Pawlak et al. | 149/71 |
| 4,299,708 | | 11/1981 | James | 252/2 |
| 4,560,485 | | 12/1985 | Székely et al. | 257/7 |
| 5,076,868 | | 12/1991 | Doll et al. | 149/19.4 |
| 5,423,384 | * | 6/1995 | Galbraith et al. | 169/12 |
| 5,439,537 | | 8/1995 | Hinshaw et al. | 149/22 |
| 5,747,730 | * | 5/1998 | Scheffee et al. | 149/47 |
| 5,783,773 | * | 7/1998 | Poole | 149/36 |
| 5,831,209 | * | 11/1998 | Kozyrev et al. | 149/21 |
| 5,861,571 | * | 1/1999 | Scheffee et al. | 102/288 |
| 5,997,666 | * | 12/1999 | Wheatley | 149/19.91 |
| 6,017,404 | * | 1/2000 | Lundstrom et al. | 149/36 |

* cited by examiner

*Primary Examiner*—Joseph D. Anthony
(74) *Attorney, Agent, or Firm*—Nixon & Vanderhye P.C.

(57) ABSTRACT

Fire suppressant compositions which are substantially free of ammonium nitrate and which comprise potassium nitrate in an amount sufficient to generate at least about 10 wt. % potassium carbonate when combusted. Most preferably, a guanidine salt, such as guanidine nitrate, is used in combination with the potassium nitrate. The compositions employed in the present invention have low pressure exponents, high burning rates and low flame temperatures.

12 Claims, 2 Drawing Sheets

FIRE SUPPRESSANT COMPOSITIONS

FIELD OF THE INVENTION

The present invention relates generally to the technical field of fire suppressant compositions. In particularly preferred embodiments, the compositions of the present invention are usefully employed to suppress fires in enclosed areas.

BACKGROUND AND SUMMARY OF THE INVENTION

The most effective conventional gaseous fire extinguishing systems available comprise the HALON-class of flame retardants and fire extinguishers, which enjoy wide usage and acceptance within the civilian and military communities. For example, HALON 104 containing carbon tetrachloride ($CCl_4$) is conventionally used to fight electrical fires. The most effective and widely used fire extinguishing agents contain bromine compounds which thermally decompose in a fire or flame to produce the bromide anion ($Br^-$) which disrupts the chain reactions involved in the burning process.

However, the HALON-class of fire extinguishers are environmentally unacceptable and are believed to cause depletion of the upper atmosphere ozone layer. Accordingly, the manufacture of HALONS was banned on Dec. 31, 1994 and the manufacture of chlorofluorocarbons (CFCs) was banned the following year on Dec. 31, 1995.

There is, therefore, an urgent need for effective alternate fire extinguishing systems that do not involve HALONS. It is toward providing such a need that the present invention is directed.

Broadly, the present invention is embodied in fire suppressant compositions which are substantially free of ammonium nitrate and which comprise potassium nitrate in an amount sufficient to generate at least about 10 wt. % potassium carbonate when combusted. Most preferably, a guanidine salt, such as guanidine nitrate, is used in combination with the potassium nitrate.

These, as well as other, aspects and advantages of the present invention will become more clear from the following detailed description of the preferred exemplary embodiments thereof which follows.

BRIEF DESCRIPTION OF THE ACCOMPANYING DRAWING

Figure 1:
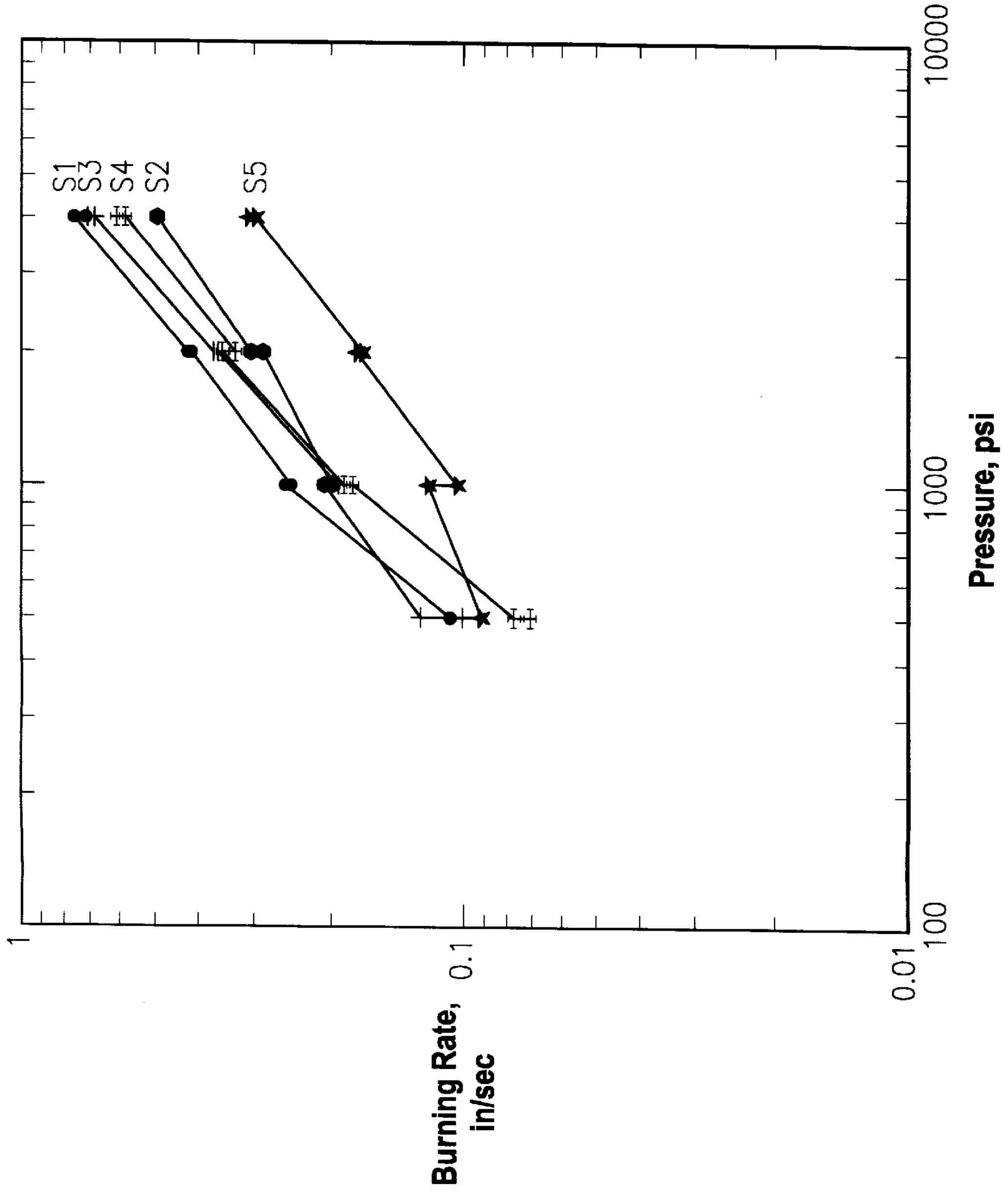
Figure 2:
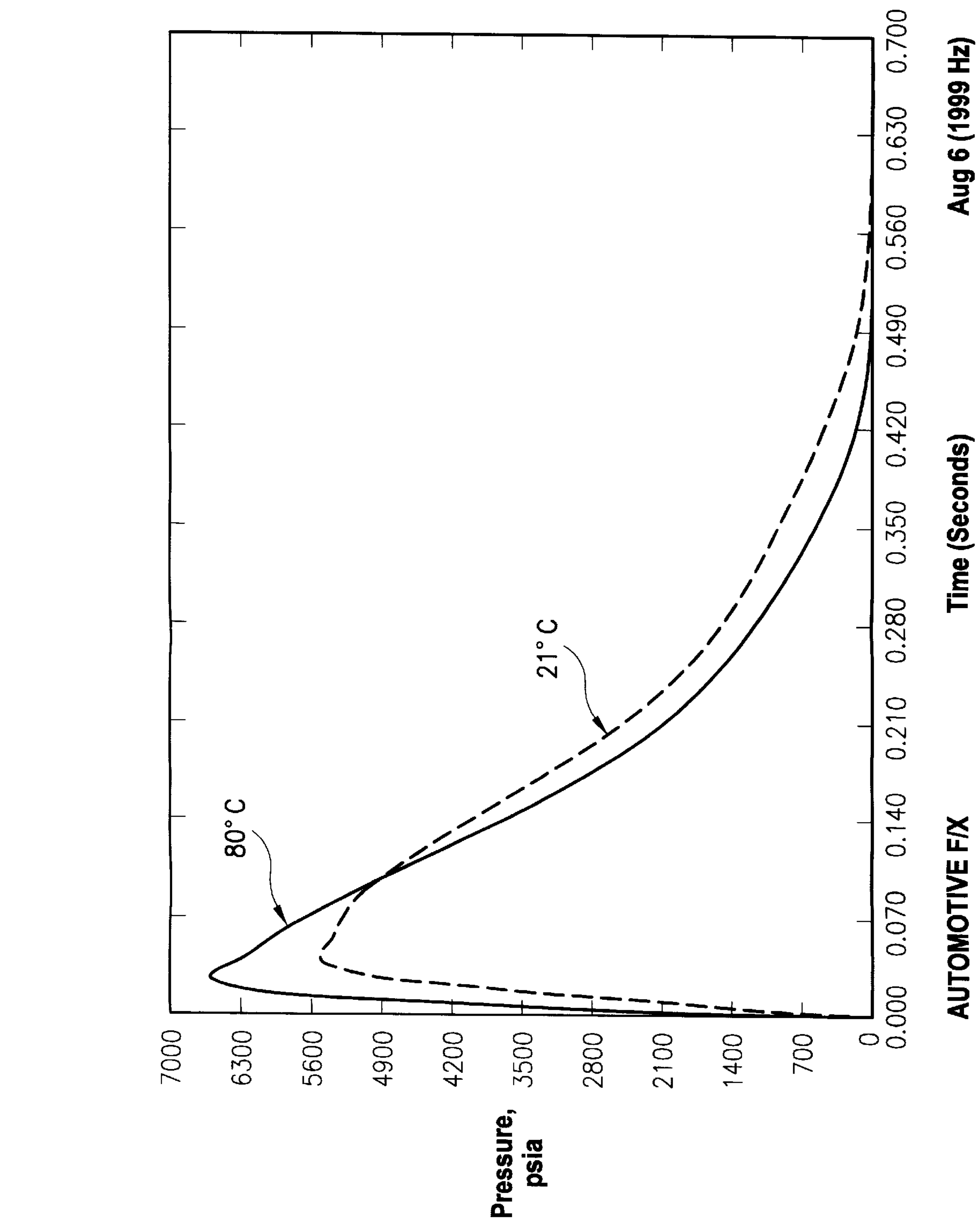

FIG. 1 is a graphical plot of burning rate (in/sec) versus pressure (psi) for formulations S1–S2 identified in the Examples below; and FIG. 2 is a graphical plot of ballistic gas generator tests using composition S1 in the Examples below and generators conditioned to 80° C. and 21° C., respectively.

DETAILED DESCRIPTION OF THE INVENTION

The compositions of this invention are free of ammonium nitrate (AN). Instead, as a necessary component, the compositions of this invention will include potassium nitrate (KN) in an amount sufficient to yield at least about 10 wt. % potassium carbonate ($K_2CO_3$) in the combustion gases when the composition is combusted. Most preferably, the KN component will be used in amounts ranging between about 30 wt. % to about 75 wt. %, and more preferably between about 40 wt. % to about 60 wt. %.

Guanidine salts or derivatives may also be employed in combination with the KN component. Suitable guanidine salts for use in the present invention include aminoguanidine nitrate (AGN), guanidine nitrate (GN), triaminoguanidine nitrate (TAGN), diaminoguanidine nitrate (DAGN), and ethylenebis-(aminoguanidinium) dinitrate (EBAGN). GN is particularly preferred. The guanidine salt is employed in the compositions of this invention in an amount between about 30 wt. % to about 65 wt. %, and more preferably between about 40 to about 55 wt. %, based on the total composition weight.

The compositions of this invention may also further comprise a minor amount of a water-soluble organic binder. The water-soluble organic binder may comprise guar gums, polyvinylpyrrolidone (PVP), polyacrylonitrile (PCN), polyvinyl alcohol (PVA) and water-soluble cellulosics such as hydroxyethylcellulose (HEC) and carboxymethyl cellulose (CMC). The water-soluble organic binder may be present in the range of about 1 wt. % to about 15 wt. %, and more preferably between about 1 to about 5 wt. %., based on total composition weight.

A burning rate modifier in the form of a powdered metal or its corresponding metal oxide, salt or complex may also be present in the compositions of the present invention. The burning rate modifier that may be employed in accordance with the present invention includes, for example, iron, copper, magnesium, aluminum, tungsten, titanium, zirconium, hafnium, calcium, strontium, bismuth, tin and zinc and their respective metal oxides, salts and complexes. One particularly preferred burning rate modifier is superfine iron oxide powder marketed as NANOCAT® material commercially available from Mach I Corporation of King of Prussia, Pa. This preferred iron oxide powder has an average particle size of about 3 nm, a specific surface area of about 250 $m^2$/gm, and bulk density of about 0.05 gm/ml. The iron oxide powder may be employed in the compositions of this invention in an amount less than about 1.5 wt. % and typically about 0.5 wt. %.

Copper compounds, such as copper phthalocyanine, may also be employed as burning rate modifiers in the compositions of the present invention. Such copper compounds may be used in an amount less than about 5 wt. %, and typically about 2 wt. %.

The burning rate modifiers noted above may be used singly, or in admixture with one or more other burning rate modifiers and/or augmentors as may be desired.

The compositions of this invention may be uncatalyzed (i.e., the composition is void of a combustion catalyst), or may be catalyzed. That is, the composition may include a combustion catalyzing effective amount of a combustion catalyst.

Additives conventionally employed in gas generant compositions may also be employed in the compositions of the present invention, provided they are compatible with all other components and with the general objectives of the present invention. Non-energetic flame retardant chemicals can also be used to supplement the formulations of the present invention. In addition, flame inhibition chemicals, such as sodium bicarbonate, potassium bicarbonate, potassium carbonate, potassium chloride and monoammonium phosphate compounds can be employed as additives to the compositions of the present invention.

When it is indicated that a fire is present or imminent in, for example, a cargo bay of an airplane or ship, or in vehicles or buildings, the compositions of the present invention may be actuated to produce and release a mixture of water vapor and inert gases in which potassium carbonate with, or without combustion species of the metal and/or metal oxide are entrained. The fire is effectively suppressed by chemical action of the generated potassium carbonate and by action of generated inert gases in reducing the oxygen content to a level that will not sustain combustion. Moreover, since the compositions of the present invention generate significant amounts of potassium carbonate, fire regeneration is substantially prevented.

The compositions employed in the present invention have low pressure exponents, high burning rates and low flame temperatures. The reaction times to produce the water vapor and inert gaseous products are typically on the order of milliseconds, thereby providing rapid and efficient fire suppression.

The present invention will be further understood from the following non-limiting Examples.

EXAMPLES

Example 1

Table 1 below exemplifies fire suppression compositions, identified as samples S1–S5, according to the present invention, in comparison to a sample, designated CS1, in accordance with commonly owned U.S. patent application Ser. No. 09/109,156 filed on Jul. 2, 1998 (the entire content of which is expressly incorporated hereinto by reference). All theoretical calculations in Table 1 below are at 2000 psi operating pressure.

TABLE 1

| | Propellant | | | | | |
|---|---|---|---|---|---|---|
| | C1 | S1 | S2 | S3 | S4 | S5 |
| AN, % | — | — | — | — | — | — |
| KN, % | 40 | 44.9 | 52.1 | 56.8 | 47.3 | 48.5 |
| GN, % | 60 | 52.6 | 42.4 | 35.7 | 49.2 | 47.5 |
| PVA, % | — | — | 3 | 5 | 1 | 1.5 |
| Copper Phthalocyanine | — | 2 | 2 | 2 | 2 | 2 |
| $Fe_3O_4$ | — | 0.5 | 0.5 | 0.5 | 0.5 | 0.5 |
| $T_c$, K | 1962 | 1985 | 2080 | 2096 | 2065 | 2068 |
| $T_e$, K | 1261 | 1308 | 1269 | 1309 | 1226 | 1237 |
| Moles of gas | 3.0 | 2.7 | 2.7 | 2.6 | 2.9 | 2.8 |
| $K_2CO_3$, % | 27.3 | 30.7 | 35.6 | 38.8 | 32.3 | 33.1 |
| $H_2O$, % | 26.6 | 23.8 | 21.7 | 20.4 | 23.1 | 22.8 |
| $N_2$, % | 33.1 | 30.7 | 27.1 | 24.6 | 29.5 | 28.9 |
| $CO_2$, % | 13.0 | 14.1 | 14.8 | 15.4 | 14.3 | 14.5 |
| $Fe_3O_4$, % | — | 0.5 | — | — | — | — |
| $Fe_2O_3$, % | — | — | 0.5 | 0.5 | 0.5 | 0.5 |
| Cu, % | — | 0.2 | — | — | 0.2 | 0.1 |
| Cu Oxides, % | — | — | 0.3 | 0.3 | 0.1 | 0.1 |

*All theoretical calculations run at 2000 psi operating pressure.

Example 2

The compositions S1–S5 were subjected to aging/cycling tests, with the results thereof being shown in Table 2 below.

TABLE 2

| | | Propellant: | | | | |
|---|---|---|---|---|---|---|
| | | S1 | S2 | S3 | S4 | S5 |
| Baseline | Pellet crush stress, psi | 5876 | 6823 | 6728 | 5844 | 6604 |
| | Strain, % | 9.0 | 7.3 | 6.9 | 7.2 | 7.2 |
| | Pellet diameter, in. | 0.523 | 0.524 | 0.524 | 0.523 | 0.523 |

TABLE 2-continued

| | | Propellant: | | | | |
|---|---|---|---|---|---|---|
| | | S1 | S2 | S3 | S4 | S5 |
| 24 cycles (−40° C. to 107° C.) | Pellet crush stress, psi | 5173 | 7059 | — | 6073 | 6320 |
| | Strain, % | 8.4 | 10 | — | 9.3 | 9.3 |
| | Diameter, in. | 0.527 | 0.526 | — | 0.526 | 0.526 |
| 50 cycles (−40° C. to 107° C.) | Pellet crush stress, psi | 5853 | 7039 | 7738 | 6262 | 6468 |
| | Strain, % | 11.9 | 11.3 | 10.9 | 8.4 | 9.0 |
| | Diameter, in. | 0.526 | 0.527 | 0.526 | 0.529 | 0.526 |
| 100 cycles (−40° C. to 107° C.) | Pellet crush stress, psi | 5806 | 7270 | 6973 | 6581 | 6855 |
| | Strain, % | 12.3 | 11.6 | 9.7 | 10.8 | 10.7 |
| | Diameter, in. | 0.528 | 0.529 | 0.530 | 0.526 | 0.526 |
| 200 cycles (−40° C. to 107° C.) | Pellet crush stress, psi | 5511 | 7272 | 6989 | 6289 | 6409 |
| | Strain, % | 14.6 | 12.7 | 11.9 | 12.6 | 11.3 |
| | Diameter, in. | 0.532 | 0.530 | 0.533 | 0.529 | 0.529 |
| 107° C. Aging 17 days | Pellet crush stress, psi | 6265 | 7709 | 8297 | 6865 | 7003 |
| | Strain, % | 11.0 | 11.0 | 10.5 | 10.1 | 10.0 |
| | Diameter, in. | 0.525 | 0.525 | 0.524 | 0.525 | 0.525 |

Example 3

Compositions S1–S5 were subjected to burning rate tests, with the results thereof being graphically depicted in accompanying FIG. 1. As can be seen, all compositions advantageously exhibited increased burning rates with an increase in pressure.

Example 4

Composition S1 was further characterized in ballistic gas generator configurations tested at ambient (21° C.) and hot (80° C.) conditions. As shown in accompanying FIG. 2, the composition exhibited low temperature sensitivity to burning rate. This allows operation across a wide range of temperatures and enables use of the composition in wider range of applications.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An ammonium nitrate-free fire suppressant composition consisting essentially of a fire suppressing effective amount of potassium nitrate and at least one guanidine salt selected from the group consisting of aminoguanidine nitrate, quanidine nitrate, triaminoguanidine nitrate, diaminoguanidine nitrate and ethylenebis(aminoguanidinium) dinitrate, said potassium nitrate and guanidine salt, said potassium nitrate and at least one guanidine salt being present in said composition in an amount sufficient to yield, on combustion, water vapor, inert combustion gases, and at least about 10 wt. % of potassium carbonate.

2. The fire suppressant composition of claim 1, further comprising copper phthalocyanine.

3. The fire suppressant composition of claim 1, further comprising a water-soluble binder.

4. The fire suppressant composition of claim 1 or 2, further comprising particles of iron or iron oxide.

5. The fire suppressant composition of claim 1, wherein the potassium nitrate is present in an amount between about 30 wt. % to about 75 wt., based on total composition weight.

6. The fire suppressant composition of claim 5, wherein the potassium nitrate is present in an amount between about 40 wt. % to about 60 wt. %.

7. The fire suppressant composition of claim 5 or 6, further comprising guanidine nitrate in an amount between about 30 wt. % to about 65 wt. %, based on the total composition weight.

8. The fire suppressant composition of claim 7, wherein the guanidine nitrate is present in an amount between about 40 to about 55 wt. %.

9. A fire suppressant composition consisting essentially of composition weight, between 40 wt. % to 60 wt. % potassium nitrate;

between 40 to 55 wt. % guanidine nitrate;

less than about 1.5 wt. % iron oxide powder; and less than about 5 wt. % copper phthalocyanine.

10. The fire suppressant composition of claim 9, wherein the iron oxide powder is present in an amount of about 0.5 wt. %.

11. The fire suppressant composition of claim 9, wherein the copper phthalocyanine is present in an amount less than about 2 wt. %.

12. A method of suppressing a fire, which comprises applying to a fire a reaction product of the fire suppressant composition of claim 1, 8 or 9.

* * * * *